(12) United States Patent
Kato et al.

(10) Patent No.: US 6,332,716 B1
(45) Date of Patent: Dec. 25, 2001

(54) COMPOSITE BEARING

(75) Inventors: Eiji Kato; Katsumi Sawano; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/453,059

(22) Filed: Dec. 2, 1999

(30) Foreign Application Priority Data

Dec. 8, 1998 (JP) .................................................. 10-348496

(51) Int. Cl.⁷ ........................... C08L 101/00; F16C 33/20
(52) U.S. Cl. .............................................. 384/300; 384/908
(58) Field of Search ...................................... 384/300, 908

(56) References Cited

FOREIGN PATENT DOCUMENTS

| | | |
|---|---|---|
| 2136439 | 9/1984 | (GB) . |
| 2232679 | 12/1990 | (GB) . |
| 2313632 | 12/1997 | (GB) . |
| 63-297457-A | * 12/1988 | (JP) . |
| 09-157532 | 6/1997 | (JP) . |

* cited by examiner

Primary Examiner—David A. Bucci
Assistant Examiner—William C Joyce
(74) Attorney, Agent, or Firm—Browdy and Neimark, P.L.L.C.

(57) ABSTRACT

A polytetrafluoroethylene is added to a base resin consisting essentially of polyether ether ketone so that the proportion of polytetrafluoroethylene becomes 0.1 to 50% by weight based on the resin layer and dispersed in the form of particles in the base resin, whereby when the resulting resin layer is bonded to a backing metal to form a composite bearing, the peel strength of the resin layer per se and mechanical strength such as bonding force or the like between the backing metal and the resin layer can be inhibited from being deteriorated. When polytetrafluoroethylene having a molecular weight of 300,000 to 500,000 is used, it can be more easily dispersed in the form of particles in the base resin.

2 Claims, 6 Drawing Sheets

COMPOSITE BEARING

BACKGROUND OF THE INVENTION

This invention relates to a composite bearing in which to a backing metal is bonded a resin layer in which polytetrafluoroethylene (referred to hereinafter as PTFE) is added to a base resin consisting essentially of polyether ether ketone (referred to hereinafter as PEEK).

As composite bearings to be incorporated into a generator, a pump or the like, bearings in which a resin layer is bonded to a backing metal have heretofore been known.

In recent years, with a tendency of a bearing device to be miniaturized, the bearing in the device has been miniaturized and a higher surface pressure has come to be applied. A composite bearing applied under such severe conditions is required to have not only excellent sliding characteristics but also various properties such as high mechanical strength and the like.

A bearing which is repeatedly subjected to, for example, starting and stopping requires a great starting power because at the time of starting, the sliding surface of the bearing is partially in solid contact with a shaft or a pin, and there is a fear that this may result in peeling of the resin layer per se and in peeling and damaging of the bonding portion between the backing metal and the resin layer. Therefore, the bearing has been required to have, in addition to wear resistance and the like during the operation, a small coefficient of friction at the time of starting and required to be excellent in peeling strength of the resin layer per se and bonding force between the backing metal and the resin layer.

As the sliding material for the bearing, there have been known resin materials in which PEEK is used as a base resin and has added thereto PTFE and carbon fiber, and the like.

PEEK is an engineering resin having excellent heat resistance, mechanical properties and wear resistance; however, when PEEK is used alone, the coefficient of friction is high, so that a resin having a low coefficient of friction such as PTFE or the like is added to the PEEK to lower the coefficient of friction thereof. On the other side, however, it is known that the addition of PTFE results in deterioration of mechanical strength. The technique disclosed in JP-A 58(1983)-160,346 teaches, as a sliding material to be used under the dry conditions, a resin consisting essentially of PEEK as the base material and also contains 2.5 to 60% by weight of PTFE and 2.5 to 60% by weight of carbon fibers. In the above publication, it is stated that a high heat distortion temperature (HDT) and a high limiting PV value are obtained with this resin composition.

Moreover, in JP-A 9(1997)-157,532 of the present inventors, as a sliding material for bearing, there is proposed a sliding resin composed of PEEK having added hereto 0.1 to 8.5% by weight of PTFE and 10 to 45% by weight of carbon fibers, based on the sliding resin. It is stated that with this composition, a sliding material excellent in wear resistance is obtained.

These inventions aim at adding carbon fiber to a base resin to improve the mechanical strength and wear resistance, and adding PTFE to the base resin to lower the coefficient of friction.

SUMMARY OF THE INVENTION

The present inventors have noticed that the mechanical properties of the resin composition are varied depending upon the shape of PTFE dispersed in the base resin and have found that the deterioration of mechanical strengths such as the peeling strength of the resin layer per se, the bonding force between the backing metal and the base resin, and the like can be prevented by dispersing PTFE in the form of particles in the base resin, whereby this invention has been accomplished.

In a bearing device requiring a measure to counter electrolytic corrosion, an insulation mechanism for preventing the electrolytic corrosion has been separately required because bearings in which carbon fibers are added to a conventional resin are lacking in electrical insulation properties.

According to the first aspect of the present invention, there is provided a composite bearing in which to a backing metal is bonded a resin layer in which PTFE is added to a base resin consisting essentially of PEEK so that the proportion of the PTFE becomes 0.1 to 50% by weight based on the weight of the resin layer, and the PTFE is dispersed in the form of particles in the base resin.

According to the second aspect of the present invention, there is provided the composite bearing of the first aspect of the invention, wherein the PTFE has a molecular weight of at least 300,000.

DETAILED DESCRIPTION OF THE INVENTION

Figure 1:
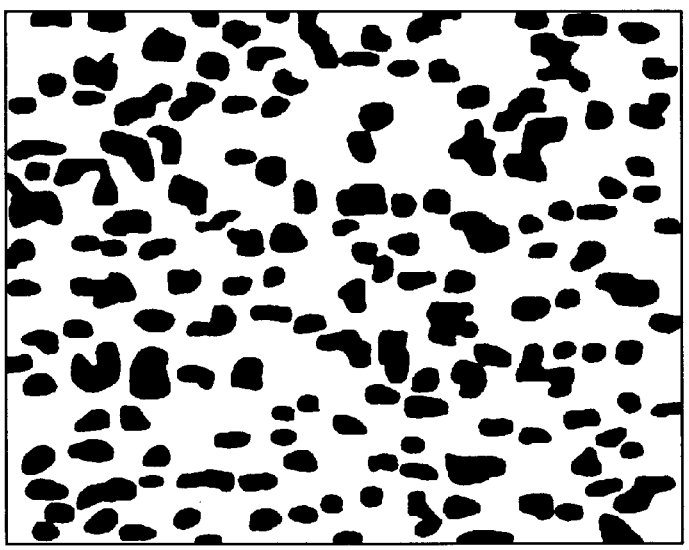
FIG. 1 is a schematic view showing the section of the resin plate of Example 4.

PEEK can be produced, for example, by the method described in JP-A 54(1979)-90,296, and it is desirable that the melt flow index thereof is in the range of 1 to 5 g/10 min as measured at 360° C. under a load of 2.16 Kg according to ASTM D1238.

The coefficient of friction of PEEK is decreased by adding PTFE thereto. When the content of PTFE is less than 0.1% by weight, its effect is not exerted sufficiently. On the other hand, when the content exceeds 50% by weight, the molding properties are deteriorated. Therefore, the PTFE content should be 0.1 to 50% by weight. It is preferably 5 to 40% by weight from the viewpoint of wear resistance, more preferably 10 to 30% by weight in view of the relation between bonding force and coefficient of friction at the time of starting.

The reason why the dispersion of PTFE in the form of particles in the base resin can inhibit the peel resistance of the resin layer per se and the bonding force between the backing metal and the resin layer from being deteriorated is considered to be as follows:

That is, when PTFE poor in adhesiveness to PEEK is present in the form of fibers, it follows that the resin layer per se becomes easy to peel along the PTFE in the form of fibers and the bonding force is lowered by the PTFE in the form of fibers appearing on the interface with the backing metal. On the other hand, in the resin layer in which PTFE is dispersed in the form of particles, the propagation of peel which is easy to cause along the interface between PEEK and PTFE is inhibited, and it follows that the peel strength and bonding force are inhibited from being lowered.

Moreover, usually, the molding using PEEK as a base resin is conducted with heating at a temperature not lower than the melting temperature of 334° C., usually at a processing temperature of about 400° C. for obtaining a sufficient fluidity. In the case where the added PTFE has a molecular weight as small as about 200,000, the melt viscosity thereof is low and hence in the processing by a melt-molding machine, it is long elongated in the form of fibers.

On the other hand, in the case of PTFE having a molecular weight of at least 300,000, the melt viscosity thereof is high, so that the PTFE is not elongated in the form of fibers and it becomes possible to disperse the PTFE in the form of particles as it is.

In other words, when as a method of molding a resin in which PEEK is a base resin, a general molding method in which the resin is molded by extruding the same from a nozzle is used and PTFE having a molecular weight of at least 300,000 is used, PTFE in the form of particles can be easily dispersed in the PEEK (the second aspect of the invention).

In addition, in the first and second aspects of the invention, it is not always necessary to add electrically conductive materials such as carbon fibers and the like for increasing the mechanical strength. When the resin layer does not contain the electrically conductive materials, it is possible to form an electrical insulating layer to electrically insulate between the bearing and the shaft or pin.

Incidentally, in the first and second aspects of the invention, the mechanical strengths and wear resistance can be further enhanced by adding carbon fibers so that the proportion thereof becomes 10 to 45% by weight based on the total weight.

As explained above, in the first and second aspects of the invention, a composite bearing in which to a backing metal is bonded a resin layer in which PTFE is added to a base resin consisting essentially of polyether ether ketone so that the proportion of the PTFE becomes 0.1 to 50% by weight based on the weight of the resin layer can be made excellent in the peel resistance of the resin layer per se and the bonding force between the resin layer and the backing metal by dispersing the PTFE in the form of particles.

Furthermore, in the bearing device requiring a measure for countering electrolytic corrosion, the omission of the insulation mechanism that has heretofore been considered necessary is made possible by using an electrical insulating layer as the resin layer, whereby the bearing device can be made simple in structure.

DESCRIPTION OF PREFERRED EMBODIMENTS

Examples 1 to 8 are explained below together with Comparative Examples 1 to 11.

First of all, a pellet-shaped, uniformly blended resin composed of PEEK and PTFE having the molecular weight shown in Table 1, the proportion of PTFE being shown in Table 1, was molded at a melt flow index of 3.1 g/10 min at a molding temperature of 400° C. by an injection molding machine to obtain a resin plate having a thickness of 3 mm, a width of 10 mm and a length of 50 mm.

The PEEK used above was PEEK 450G (a trade name of ICI in United Kingdom).

The PTFE used above was C180 (a trade name of DAIKIN INDUSTRIES, LTD.) having a molecular weight of 500,000, C169 (a trade name of DAIKIN INDUSTRIES, LTD.) having a molecular weight of 300,000, L5 (a trade name of DAIKIN INDUSTRIES, LTD.) having a molecular weight of 200,000 or KTL610 (a trade name of Mitsui DuPont Fluorochemical Co., Ltd.) having a molecular weight of 100,000.

TABLE 1

| | PTFE | | Peel | Shear | Coefficient of friction |
|---|---|---|---|---|---|
| | Molecular weight | Content (wt. %) | strength (kg/10 mm) | strength (MPa) | at time of starting |
| Example | | | | | |
| 1 | 300,000 | 20 | 6.0 | 32 | 0.08 |
| 2 | 500,000 | 5 | 10 | 40 | 0.09 |
| 3 | 500,000 | 10 | 8.5 | 37 | 0.08 |
| 4 | 500,000 | 15 | 7 | 35 | 0.08 |
| 5 | 500,000 | 20 | 6.5 | 33 | 0.08 |
| 6 | 500,000 | 30 | 5.5 | 30 | 0.08 |
| 7 | 500,000 | 40 | 4.5 | 28 | 0.08 |
| 8 | 500,000 | 50 | 4.0 | 25 | 0.08 |
| 1 | — | 0 | — | — | 0.13 |
| 2 | 100,000 | 5 | 3 | 20 | 0.09 |
| 3 | 100,000 | 10 | 1 | 12 | |
| 4 | 100,000 | 15 | 0.7 | 10 | |
| 5 | 100,000 | 20 | 0.6 | 8 | |
| 6 | 190,000 | 30 | 0.5 | 7 | |
| 7 | 100,000 | 40 | 0.4 | 6 | 0.08 |
| 8 | 100,000 | 50 | 0.3 | 5 | |
| Comparative Example | | | | | |
| 9 | 100,000 | 60 | 0.2 | 3 | |
| 10 | 200,000 | 20 | 0.6 | 10 | 0.08 |
| 11 | 500,000 | 60 | 2.0 | 15 | 0.08 |

Figure 2:
FIG. 2 is a schematic view showing the section of the resin plate of Comparative Example 4.

FIG. 1 and FIG. 2 show schematically the sections of the resin plates of Example 4 and Comparative Example 4, and it is confirmed that in FIG. 2 relating to Comparative Example 4, PTFE is long elongated in the form of fibers in the resin layer bonded onto the backing metal, while in FIG. 1 relating to Example 4, PTFE is present in the form of particles.

Figure 3:
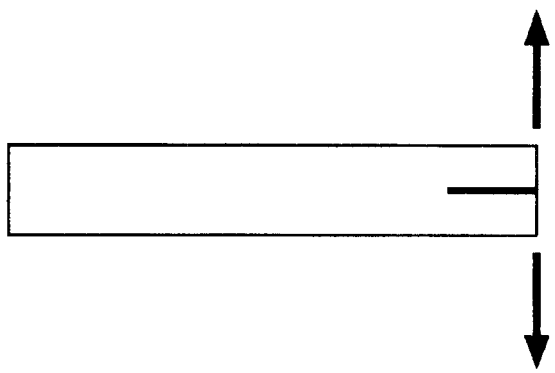
FIG. 3 is a front view showing the outline of a peel test.

Each of the resin plates obtained in the Examples and the Comparative Examples was subjected to peel test of resin layer (plate) per se. The outline of the peel test is shown in FIG. 3. A slit of about 10 mm was formed at the center of an edge face of the resin plate as shown in FIG. 3 and this resin plate was fixed, after which a load was applied thereto at the slit end portion vertically to the plate surface. The load at which the plate was torn is defined as the peel strength. The results obtained are shown in Table 1.

Figure 4:
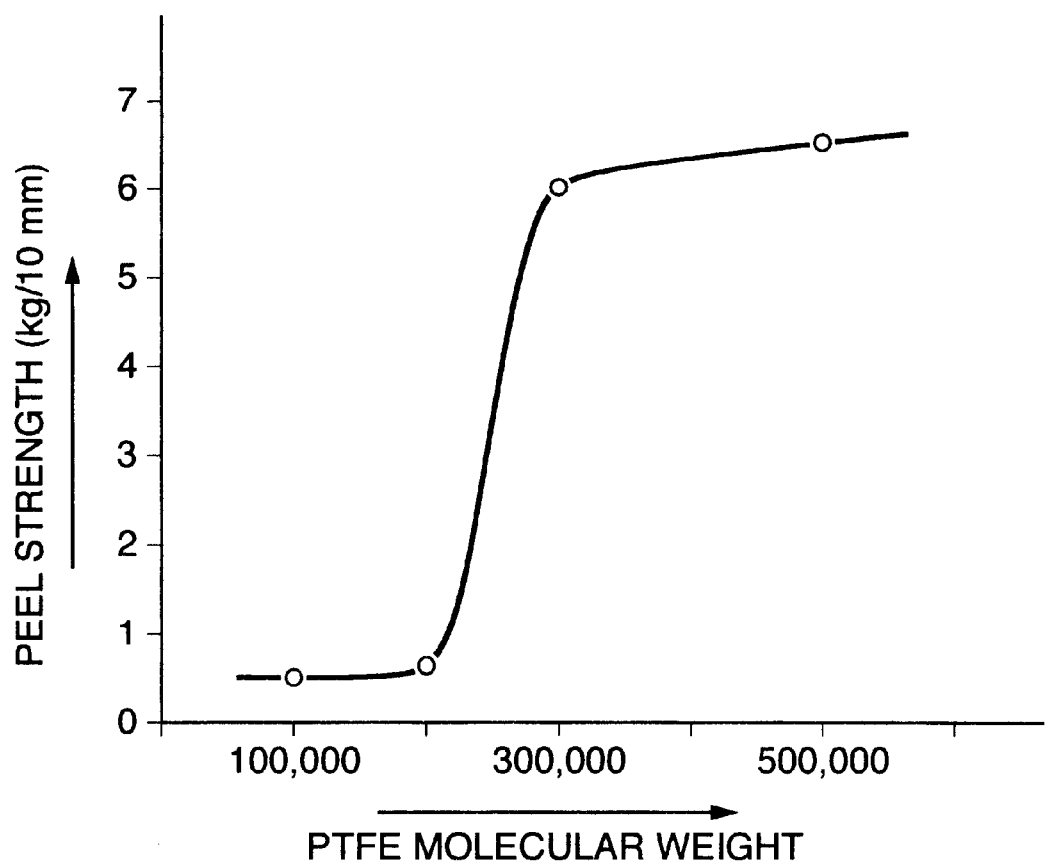
FIG. 4 is a graph showing the influence of the molecular weight of PTFE exerted upon peel strength.

A relation between molecular weight and peel strength on the case where the PTFE content is 20% by weight is shown in FIG. 4 based on the results of peel test shown in Table 1. By this peel test, it is clarified that when the molecular weights of PTFE are 100,000 and 200,000, the peel strength is about 1 kg/10 mm or less, while when the molecular weight of PTFE is 300,000 or more, the peel strength is about 6 kg/10 mm or more, so that the peel strength is extremely increased between the molecular weight of 200,000 and the molecular weight of 300,000.

Figure 5:
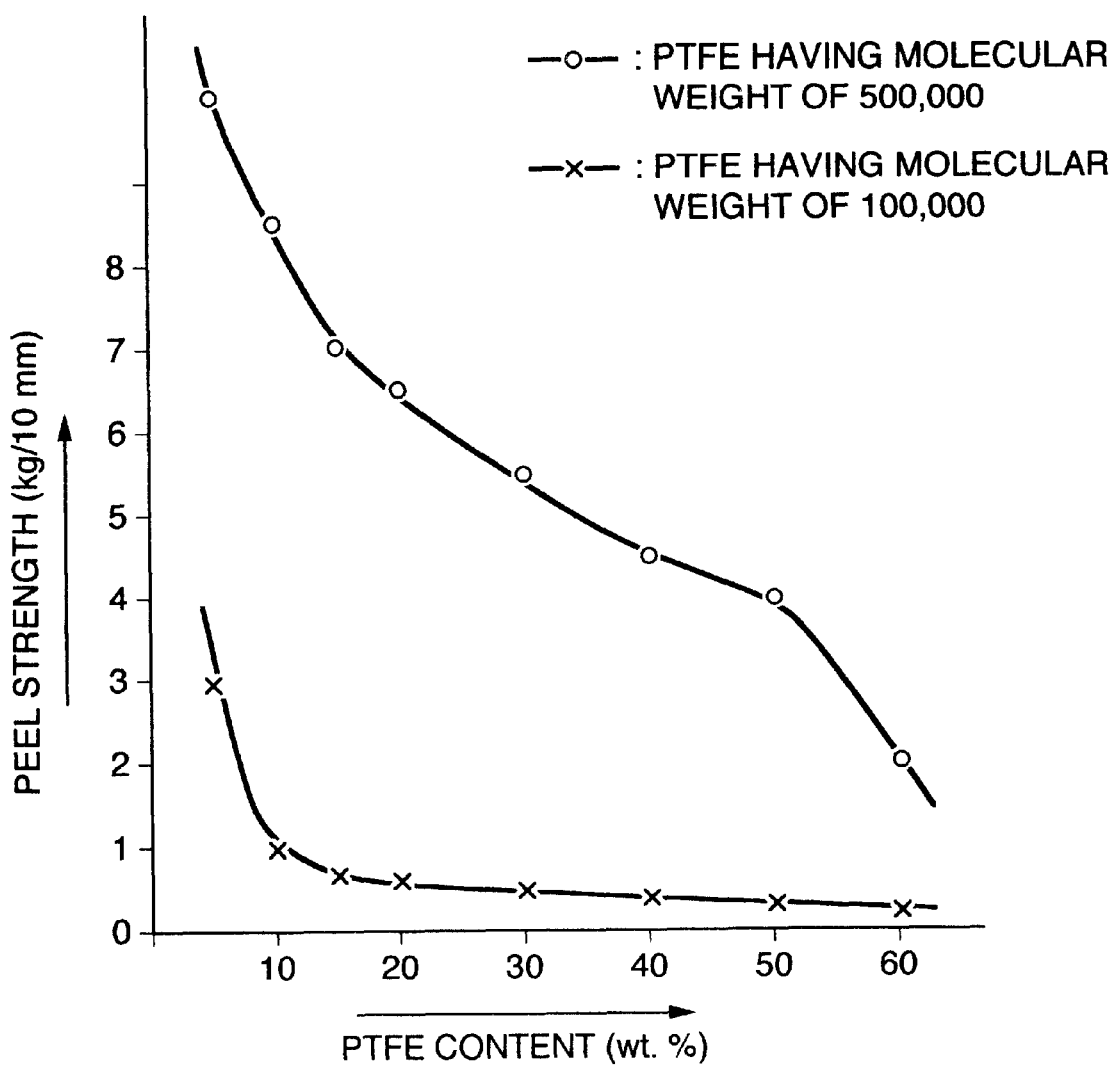
FIG. 5 is a graph showing the influence of the PTFE content exerted upon peel strength.

In FIG. 5, the influence of the PTFE content in the resin plate exerted on the peel strength when the molecular weights of PTFE are 100,000 and 500,000 is shown with graphs, and it is confirmed that with an increase of the PTFE content, the peel strength is lowered in the two cases. Moreover, in the case of PTFE having a molecular eight of 100,000, low peel strength is shown as a whole and, at the same time, it is clear that the peel strength is rapidly lowered before the PTFE content reaches 10% by weight and gradually lowered in the PTFE content range larger than that.

On the other hand, in the case of PTFE having a molecular weight of 500,000, the peel strength is gradually lowered until a PTFE content of 50% by weight, but rapidly lowered in the PTFE content range of more than 50% by weight. However, as a whole, high peel strength is shown.

Figure 6:
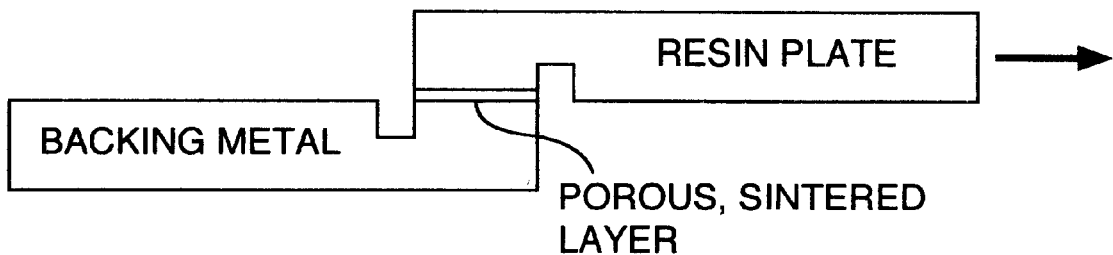
FIG. 6 is a front view showing the outline of bonding force (shear strength) test.

Subsequently, a bonding force test was conducted. In this bonding force test, copper alloy powder was spread in a thickness of 0.5 mm on a copper-plated steal plate having a thickness of 3 mm and sintered to form a porous, sintered layer. The above-mentioned resin plate (width: 10 mm) of each of the Examples and the Comparative Examples was put on this porous, sintered layer so that the two overlapped by 5 mm as shown in FIG. 6 in the state that the porous, sintered layer was heated at 350 to 400° C., and they were subjected to pressure-welding by a press and then to impregnation coating to obtain a test sample, after which a load was applied to the test sample in the plate surface direction of the resin plate. The shear load (shear strength) at which the test sample was broken is defined as the bonding force.

The results of this bonding force test are also shown in Table 1.

Figure 7:
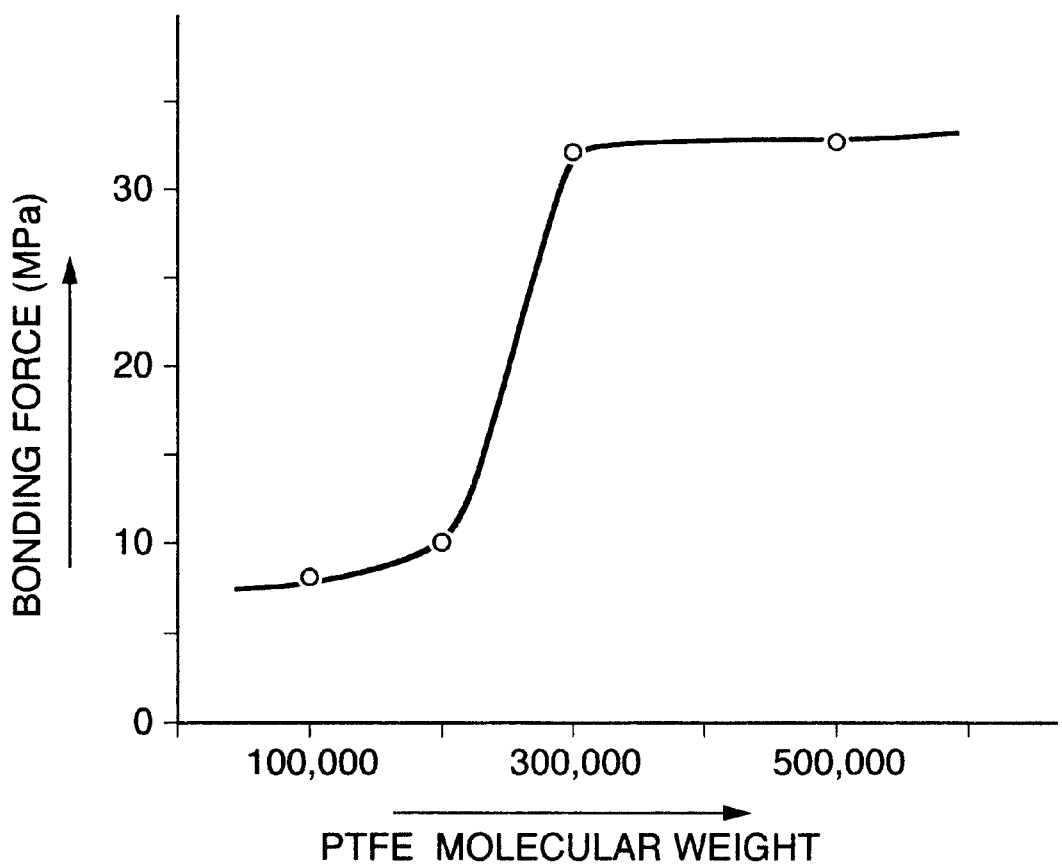
FIG. 7 is a graph showing the influence of the molecular weight of PTFE exerted upon bonding force (shear strength).

A relation between molecular weight and bonding force (shear strength) on the case where the PTFE content is 20% by weight is shown in FIG. 7 based on the results of bonding force test shown in Table 1. From the results of this bonding force test, it is clear that the bonding force is rapidly increased from 10 MPa to 32 MPa between the molecular weight of PTFE of 200,000 (Comparative Example 10) and the molecular weight of PTFE of 300,000 (Example 1).

Figure 8:
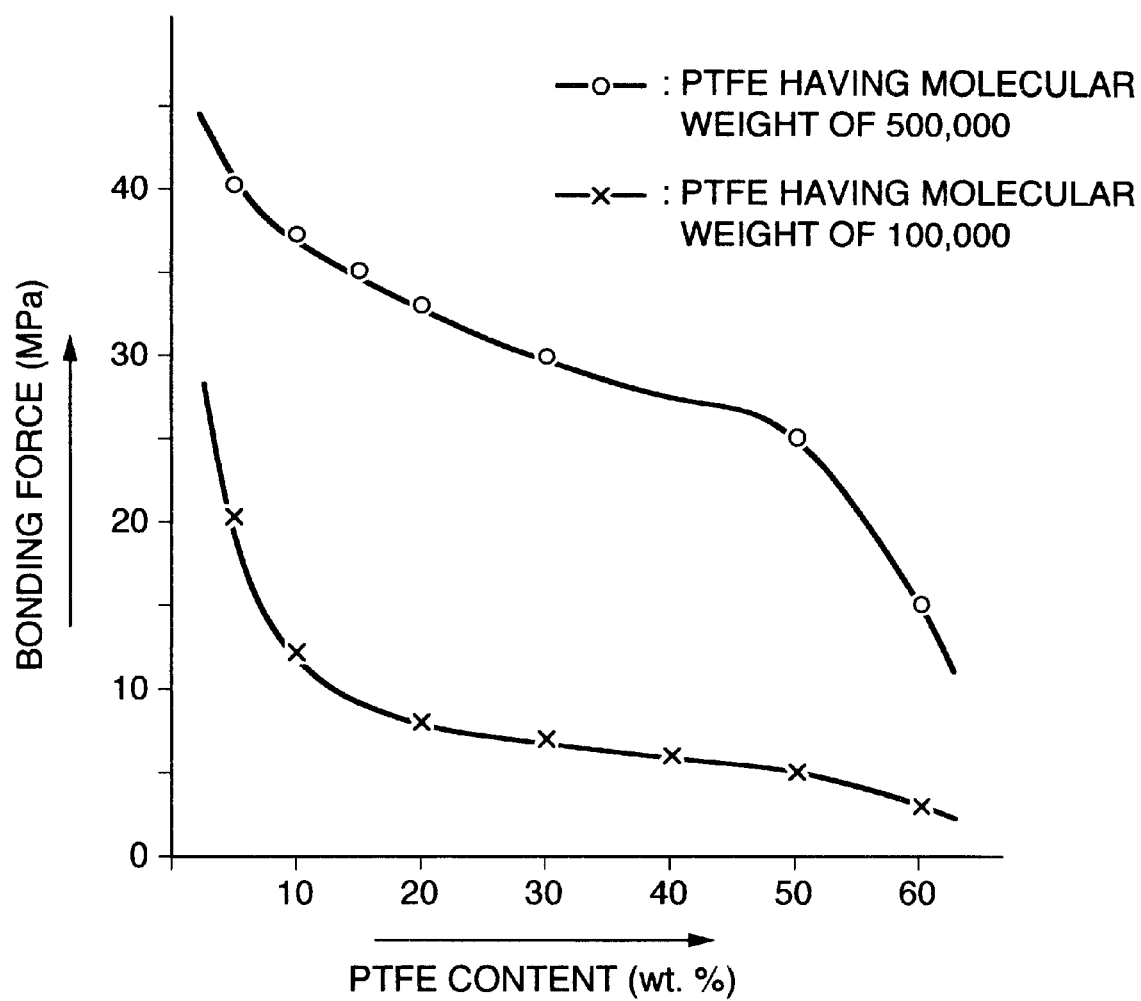
FIG. 8 is a graph showing the influence of PTFE content exerted upon bonding force.
Figure 9:
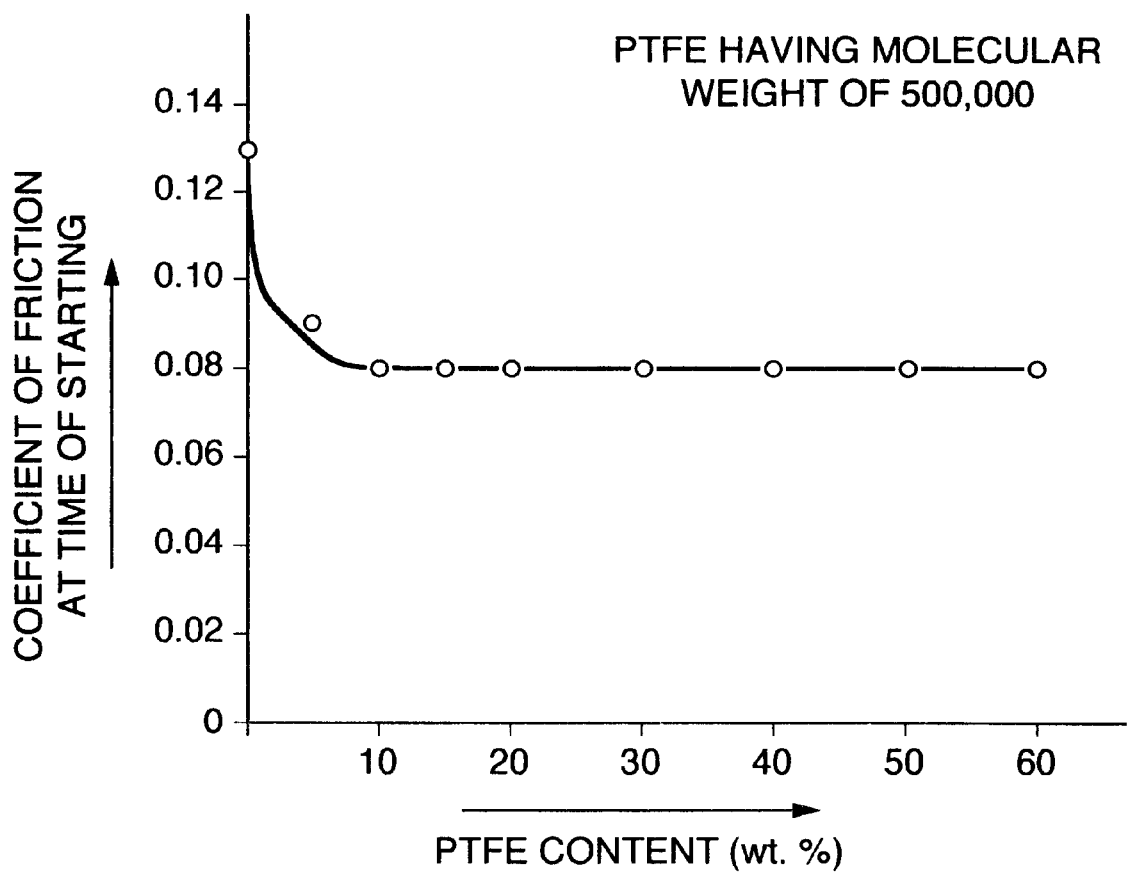
FIG. 9 is a graph showing the influence of PTFE content exerted upon coefficient of friction at the time of starting.

Moreover, in FIG. 8, the influence of the PTFE content exerted on bonding force (shear strength) as to PTFEs having molecular weights of 100,000 and 500,000 is shown with a graph, and it is confirmed that with an increase of the PTFE content, the bonding force is lowered in both cases. In addition, it is clarified that in the case of PTFE having a molecular weight of 100,000, the bonding force is remarkably lowered by incorporating it in a small amount into PEEK, while in the case of PTFE having a molecular weight of 500,000, the bonding force is gradually lowered and a high bonding force is obtained as a whole, though in the PTFE content range exceeding 50% by weight, the bonding force is rapidly lowered.

Subsequently, a coefficient of friction at the time of starting was measured. A test of coefficient of friction at the time of starting was conducted as follows: On a copper-plated steel plate having a thickness of 3 mm, copper alloy powder was spread in a thickness of 0.5 mm and then sintered to form a porous, sintered layer. The above-mentioned resin plate was superimposed on this porous, sintered layer in the state that the porous sintered layer was heated at 350 to 400° C., and they were subjected to pressure-welding by a press and then to impregnation coating. Subsequently, it was processed into a washer shape having an outer diameter of 27.2 mm and an inner diameter of 22 mm to obtain test samples for the Comparative Examples and the Examples. Using the test samples for the Comparative Examples and the Examples obtained, a test of coefficient of friction at the time of starting was made under the conditions shown in Table 2. The results of these tests are also shown in Table 1.

From the test results shown in Table 1, it is clarified that until a PTFE content of 10% by weight, the coefficient of friction at the time of starting is lowered, but in the PTFE content range larger than that, the coefficient of friction has a constant value.

TABLE 2

| Test conditions | | | Unit |
|---|---|---|---|
| Test piece size | Outer diameter | 27.2 | mm |
| | Inner diameter | 22 | mm |
| | Thickness | 5 | mm |
| Number of revolution | | 1500 | rpm |
| Peripheral speed | | 2 | m/s |
| Pressure | | 8 | MPa |
| Lubricant | | VG46 | |
| Counter pin | Material | S45C | |
| | Roughness | 1.0 | Rmax μm |
| | Hardness | 180–220 | Hv 10 |

What is claimed is:

1. A composite bearing in which to a backing metal is bonded to a resin layer in which polytetrafluoroethylene is added to a base resin consisting essentially of polyether ether ketone so that the proportion of polytetrafluoroethylene becomes 0.1 to 50% by weight based on the resin layer and the polytetrafluoroethylene is dispersed in the form of particles in the base resin, wherein the molecular weight of the polytetrafluoroethylene is at least 300,000.

2. The composite bearing according to claim 1, wherein the molecular weight of the polytetrafluoroethylene is 300,000 to 500,000.

* * * * *